United States Patent
Miyajima

(10) Patent No.: US 9,673,641 B2
(45) Date of Patent: Jun. 6, 2017

(54) VOLTAGE DETECTING DEVICE

(71) Applicant: KEIHIN CORPORATION, Tokyo (JP)

(72) Inventor: Kazuya Miyajima, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 217 days.

(21) Appl. No.: 14/592,627

(22) Filed: Jan. 8, 2015

(65) Prior Publication Data

US 2015/0207342 A1     Jul. 23, 2015

(30) Foreign Application Priority Data

Jan. 17, 2014 (JP) .................. 2014-007218

(51) Int. Cl.
    *H02J 7/00*   (2006.01)
(52) U.S. Cl.
    CPC .......... *H02J 7/0021* (2013.01); *H02J 7/0014* (2013.01); *Y02T 10/7055* (2013.01)
(58) Field of Classification Search
    USPC ........................................................ 320/116
    See application file for complete search history.

(56) References Cited

U.S. PATENT DOCUMENTS

| 2008/0219337 A1 | 9/2008 | Kawata et al. |
| 2010/0231167 A1* | 9/2010 | Ohnuki ................. H02J 7/0018 320/119 |
| 2011/0298424 A1* | 12/2011 | Yamauchi ............. B60L 3/0046 320/118 |
| 2012/0141848 A1 | 6/2012 | Nagaoka et al. |
| 2013/0257443 A1* | 10/2013 | Suzuki ............... G01R 31/3658 324/433 |

FOREIGN PATENT DOCUMENTS

| JP | 2008-220074 A | 9/2008 |
| JP | 2008-289234 A | 11/2008 |

* cited by examiner

Primary Examiner — Robert Grant
(74) Attorney, Agent, or Firm — Westerman, Hattori, Daniels & Adrian, LLP

(57) ABSTRACT

A voltage detecting device includes a plurality of voltage detecting circuits provided for battery modules of a battery, the battery being formed by connecting, in series with each other, the battery modules each formed by connecting battery cells in series with each other, the plurality of voltage detecting circuits being configured to detect voltage of each of the battery cells; a plurality of voltage detecting lines connecting the battery cells to the voltage detecting circuits; and a control device controlling charge and discharge of the battery cells on a basis of detection information obtained from the voltage detecting circuits, a voltage detecting line having a lowest potential being connected to one of the voltage detecting circuits and a voltage detecting line having a highest potential being connected to the other of the voltage detecting circuits, being adjacent and connected to each other via a first capacitor.

4 Claims, 3 Drawing Sheets

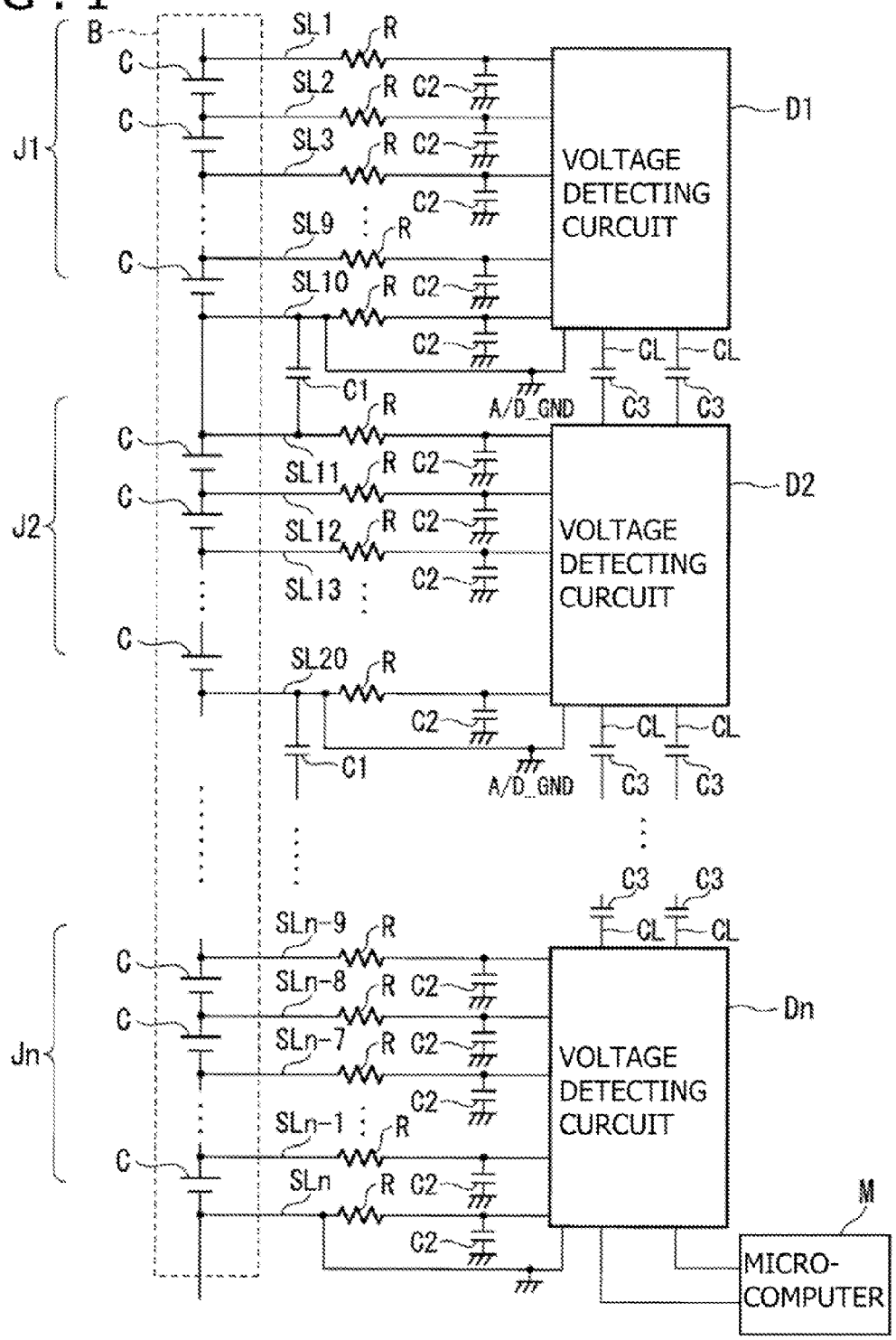

TEST RESULT OF NOISE IN PRESENT EMBODIMENT

TEST RESULT OF NOISE IN RELATED ART

VOLTAGE DETECTING DEVICE

CROSS REFERENCE TO RELATED APPLICATION

The present application claims priority under 35 U.S.C. §119 to Japanese Patent Application No. 2014-007218 filed in the Japan Patent Office on Jan. 17, 2014, the entire content of which is hereby incorporated by reference.

TECHNICAL FIELD

The present invention relates to a voltage detecting device.

BACKGROUND OF THE INVENTION

A storage battery managing control device that can improve the reliability of serial communication is disclosed in Japanese patent laid-open publication No. 2008-220074 ("JP '074"), which describes the storage battery managing control device having a configuration formed by connecting a plurality of cell controllers and a battery controller to each other in a chained manner for serial communication. In this storage battery managing control device, the battery controller or the cell controllers includes a communication speed detecting means for detecting the communication speed of data input from another controller, and a reception timing correcting means for correcting the timing of reception of the data input from the other controller on the basis of the communication speed detected by the communication speed detecting means.

SUMMARY OF THE INVENTION

In JP '074, due to the effect of path impedance of a bus bar, a wire harness, and the like between cell controllers adjacent to each other, a voltage difference occurs between the cell controllers, noise enters depending on a frequency band, and consequently an error may occur in daisy chain communication (corresponding to the above-described serial communication) by the cell controllers.

The present invention reduces susceptibility to noise, and thus improves daisy chain communication performance.

According to one embodiment, a voltage detecting device includes a plurality of voltage detecting circuits, a plurality of voltage detecting lines, and a control device. The plurality of voltage detecting circuits are provided for respective battery modules of a battery, the battery being formed by connecting, in series with each other, the battery modules each formed by connecting battery cells in series with each other, the plurality of voltage detecting circuits being configured to detect voltage of each of the battery cells. The plurality of voltage detecting lines connect the battery cells to the voltage detecting circuits. The control device controls charge and discharge of the battery cells on a basis of detection information obtained from the voltage detecting circuits. The voltage detecting circuits detect the voltage of each of the battery cells via the voltage detecting lines, the plurality of voltage detecting circuits are connected in series with each other via a communication line, and one of the voltage detecting circuits at one end of the voltage detecting circuits connected in series with each other being connected to the control device via a communication line. A voltage detecting line having a lowest potential being connected to one of the voltage detecting circuits adjacent to each other, and a voltage detecting line having a highest potential being connected to another of the voltage detecting circuits adjacent to each other, being adjacent to each other and connected to each other via a first capacitor.

According to this embodiment, it is possible to reduce susceptibility to noise, and perform daisy chain communication ideally.

According to another embodiment, the first capacitor described above is selected according to a frequency noise characteristic.

According to another embodiment, the voltage detecting device described above further includes a filter circuit provided for each of the voltage detecting lines, wherein the filter circuit includes a resistor inserted in each of the voltage detecting lines such that the resistor has a first terminal connected to one of the battery cells and a second terminal connected to one of the voltage detecting circuits, and a second capacitor provided for each resistor, the second capacitor having a first terminal connected to the second terminal of the resistor and having a second terminal connected to a ground, and the second capacitor has a higher capacitance than the first capacitor.

According to another embodiment, the voltage detecting device described above further includes a third capacitor inserted in the communication line establishing connection between the voltage detecting circuits, wherein the third capacitor has a lower capacitance than the first capacitor.

BRIEF DESCRIPTION OF THE DRAWINGS

The advantages of this invention will become apparent in the following description taken in conjunction with the drawings, wherein:

FIG. 1 is a circuit diagram of a voltage detecting device;

DETAILED DESCRIPTION OF THE INVENTION

Figure 2A:
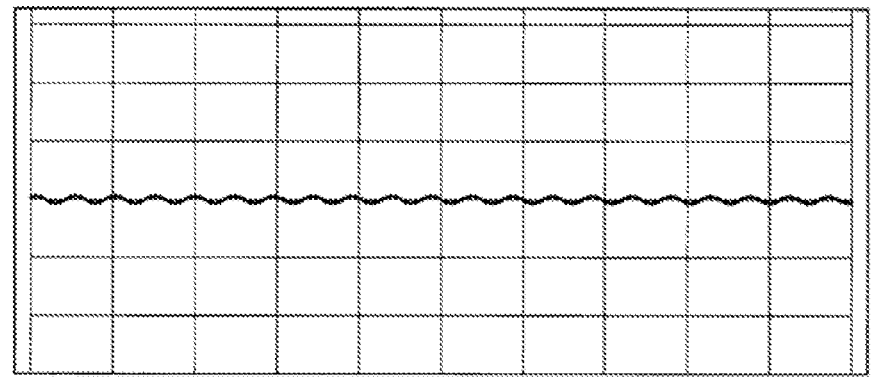
FIG. 2A is a diagram showing a test result indicating noise reduction by the voltage detecting device according to the embodiment of the present technology.

One embodiment of the invention is described with reference to the drawings.

A voltage detecting device according to the invention is mounted in a moving vehicle such as an EV (Electric Vehicle), a HV (Hybrid Vehicle), or the like, and monitors voltage states of battery cells C of battery modules J1 to Jn constituting a battery B. As shown in FIG. 1, the voltage detecting device includes voltage detecting lines SL1 to SLn, first capacitors C1, resistors R, second capacitors C2, third capacitors C3, voltage detecting circuits D1 to Dn, and a microcomputer M. The first capacitors C1, the second capacitors C2, the resistors R, the third capacitors C3, the voltage detecting circuits D1 to Dn, and the microcomputer M are mounted on a board not shown in the figures.

The voltage detecting lines SL1 to SLn are conductors that connect the battery cells C to the voltage detecting circuits D1 to Dn. The voltage detecting circuits D1 to Dn detect the voltages of powers of the respective battery cells C which voltages are input to the voltage detecting circuits D1 to Dn via the voltage detecting lines SL1 to SLn.

A first capacitor C1 is provided between a voltage detecting line having a lowest potential which voltage detecting line is connected to one of voltage detecting circuits D1 to Dn adjacent to each other (one of the voltage detecting lines SL1 to SLn) and a voltage detecting line having a highest potential which voltage detecting line is connected to the other of the voltage detecting circuits D1 to Dn adjacent to each other (one of the voltage detecting lines SL1 to SLn). The voltage detecting line having the lowest potential and the voltage detecting line having the highest potential are arranged so as to be adjacent to each other. For example, a first capacitor C1 is provided between the voltage detecting line SL10 having the lowest potential, which voltage detecting line SL10 is connected to the voltage detecting circuit D1, and the voltage detecting line SL11 having the highest potential, which voltage detecting line SL11 is connected to the voltage detecting circuit D2. As described later in detail, the first capacitor C1 is selected according to frequency noise characteristics.

A resistor R is inserted in each of the voltage detecting lines SL1 to SLn such that the resistor R has one terminal connected to one of the battery cells C and has the other terminal connected to one of the voltage detecting circuits D1 to Dn.

A second capacitor C2 is provided for each resistor R, the second capacitor C2 having one terminal connected to the other terminal of the resistor R and having the other terminal connected to a ground. The second capacitor C2 has a higher capacitance than the first capacitor C1.

A third capacitor C3 is inserted in each of communication lines CL that establish connection between the voltage detecting circuits D1 to Dn. The third capacitor C3 has a lower capacitance than the first capacitor C1.

The voltage detecting circuits D1 to Dn are dedicated IC (Integrated Circuit) chips that are provided so as to correspond to the respective battery modules J1 to Jn of the battery B, and which detect the voltage of each of the battery cells C and have an A/D converting function of converting a result of the detection into digital data (voltage detection data) and a function of communicating with the microcomputer M. The voltage detecting circuits D1 to Dn are connected in series with each other by the communication lines CL, and are capable of daisy chain communication. Of such voltage detecting circuits D1 to Dn, the voltage detecting circuit Dn at one end of the series connection can be operated by a power of a high voltage (for example 60 V). The voltage detecting circuit Dn is connected to the microcomputer M operable by a low voltage (for example 5 V) via an insulating element such as a photocoupler or the like (not shown) and a communication line connected to the insulating element. Therefore, the voltage detecting circuit Dn is electrically insulated from the microcomputer M, and is communicatably connected to the microcomputer M.

The microcomputer M is an IC chip including for example a CPU (Central Processing Unit), a ROM (Read Only Memory), a RAM (Random Access Memory), and an interface circuit for transmitting and receiving various kinds of signals to and from the electrically interconnected parts. The microcomputer M is communicatably connected to the voltage detecting circuit D via the above-described insulating element and the communication line connected to the insulating element. The microcomputer M controls the operation of the whole of the voltage detecting device by performing various kinds of arithmetic processing on the basis of various kinds of arithmetic control programs stored in the ROM and communicating with the parts.

The action of the thus formed present voltage detecting device will next be described.

The first capacitors C1 provided in the present voltage detecting device can remove communication noise between the voltage detecting circuits D1 to Dn. That is, it is possible to remove noise caused by difference between voltages input to the respective voltage detecting circuits due to the effect of path impedance of the voltage detecting line having the lowest potential and the voltage detecting line having the highest potential between the voltage detecting circuits adjacent to each other. For example, the capacitance of the first capacitors C1 is a few tenths of µF.

Figure 2B:
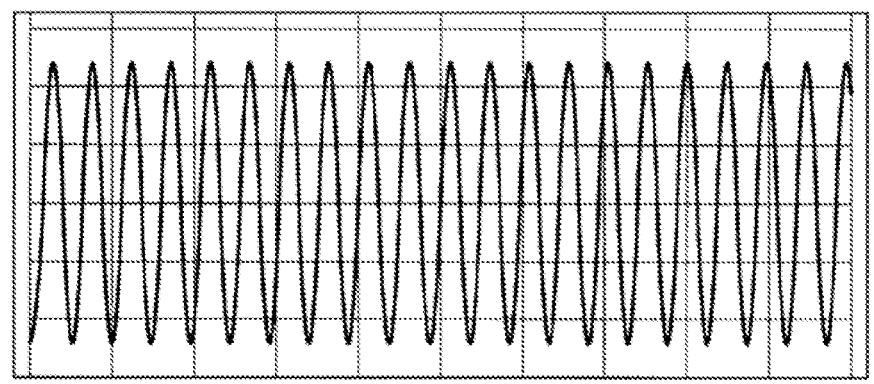
FIG. 2B is a diagram showing a test result in a case of a large amount of noise in related art.
Figure 3:
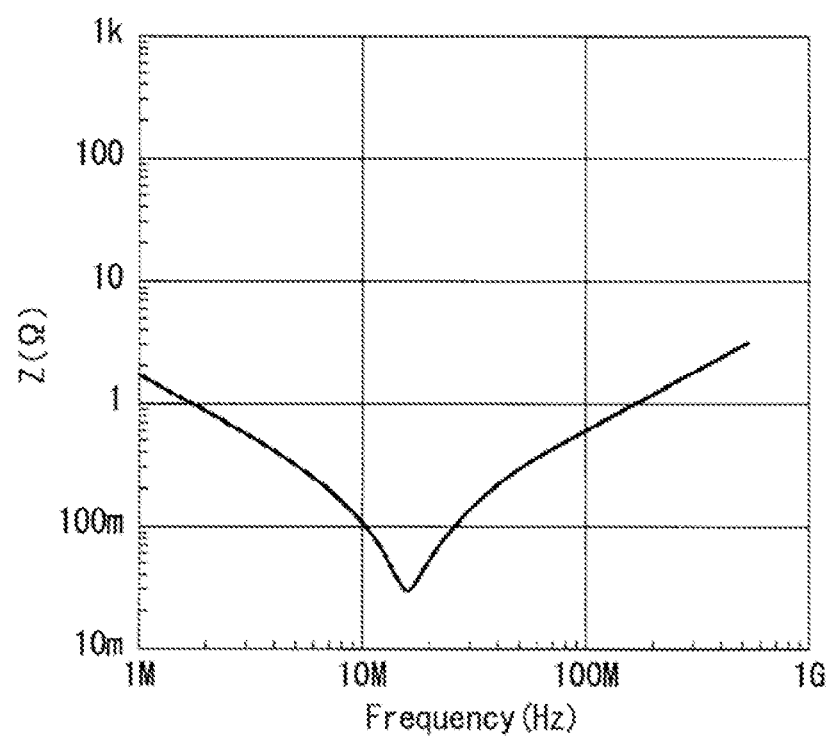
FIG. 3 is a diagram showing the frequency characteristics of a first capacitor C1 in the voltage detecting device shown in FIG. 1.

Consequently, as shown in FIG. 2A, for example, noise included in the voltage detecting line SL11 can be reduced. On the other hand, in the past, as shown in FIG. 2B, a large amount of noise is included in the voltage detecting line SL11 as compared with FIG. 2A. In addition, when communication is interrupted due to the effect of noise in a 20-MHz band, for example, a capacitor having a low impedance in the 20-MHz band is selected and used as the first capacitors C1, as shown in FIG. 3.

The second capacitors C2 and the resistors R are filter circuits in the present embodiment, and can therefore remove noise included in analog signals in the voltage detecting lines SL1 to SLn. For example, the capacitance of the second capacitors C2 is a few µF.

The third capacitors C3 can remove noise included in daisy chain communication in the communication lines CL. For example, the capacitance of the third capacitors C3 is a few thousand pF.

According to such an embodiment, a voltage detecting line having a lowest potential which voltage detecting line is connected to one of voltage monitoring circuits adjacent to each other and a voltage detecting line having a highest potential which voltage detecting line is connected to the other voltage detecting circuit are connected to each other via a first capacitor C1. It is thereby possible to reduce susceptibility to noise, and thus perform daisy chain communication ideally. In addition, according to the present embodiment, by providing the filter circuits including the second capacitors C2 and the resistors R, it is possible to reduce susceptibility to noise, and perform daisy chain communication ideally. Further, according to such an embodiment, by providing the third capacitors C3, it is possible to reduce susceptibility to noise, and perform daisy chain communication ideally.

An embodiment of the present invention has been described above. However, the present technology is not limited to the foregoing embodiment, but may be modified as follows, for example.

The foregoing embodiment includes the filter circuits including the second capacitors C2 and the resistors R and the third capacitors C3. However, the present invention is not limited to this. For example, neither the filter circuits nor the third capacitors C3 may be provided, or either only the filter circuits or only the third capacitors C3 may be provided.

It should be understood by those skilled in the art that various modifications, combinations, sub-combinations and alterations may occur depending on design requirements and other factors insofar as they are within the scope of the appended claims or the equivalents thereof.

I claim:
1. A voltage detecting device comprising:
 a plurality of voltage detecting circuits provided for respective battery modules of a battery, the battery being formed by connecting, in series with each other, the battery modules each formed by connecting battery cells in series with each other, the plurality of voltage detecting circuits configured to detect voltage of each of the battery cells;

a plurality of voltage detecting lines connecting the battery cells to the voltage detecting circuits; and a control device controlling charge and discharge of the battery cells on a basis of detection information obtained from the voltage detecting circuits, wherein the plurality of voltage detecting circuits detect the voltage of each of the battery cells via the voltage detecting lines, the plurality of voltage detecting circuits being connected in series with each other via a communication line, and one of the voltage detecting circuits at one end of the voltage detecting circuits connected in series with each other being directly connected to the control device via a communication line, a voltage detecting line having a lowest potential, the voltage detecting line having the lowest potential being connected to one of the voltage detecting circuits adjacent to each other, and a voltage detecting line having a highest potential, the voltage detecting line having the highest potential being connected to another of the voltage detecting circuits adjacent to each other, being adjacent to each other and directly connected to each other via a first capacitor.

2. The voltage detecting device according to claim 1, wherein the control device is configured to select the first capacitor according to a frequency noise characteristic.

3. The voltage detecting device according to claim 1, further comprising:
- a filter circuit provided for each of the voltage detecting lines, the filter circuit comprising:
- a resistor inserted in each of the voltage detecting lines such that the resistor has a first terminal connected to one of the battery cells and has a second terminal connected to one of the voltage detecting circuits; and
- a second capacitor provided for each resistor, the second capacitor having a first terminal connected to the second terminal of the resistor and a second terminal connected to a ground, wherein
- the second capacitor has a higher capacitance than the first capacitor.

4. The voltage detecting device according to claim 1, further comprising:
- a third capacitor inserted in the communication line establishing connection between the voltage detecting circuits, wherein
- the third capacitor has a lower capacitance than the first capacitor.

* * * * *